United States Patent
Kamimura et al.

(10) Patent No.: US 8,189,112 B2
(45) Date of Patent: May 29, 2012

(54) LUMINANCE SIGNAL/CARRIAGE COLOR SIGNAL SEPARATING CIRCUIT AND METHOD

(75) Inventors: Shigeki Kamimura, Tsurugashima (JP); Yuichi Honda, Fukaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1435 days.

(21) Appl. No.: 11/789,576

(22) Filed: Apr. 24, 2007

(65) Prior Publication Data
US 2008/0043151 A1 Feb. 21, 2008

(30) Foreign Application Priority Data
Jun. 30, 2006 (JP) ................. 2006-182052

(51) Int. Cl.
*H04N 9/78* (2006.01)
*H04N 9/77* (2006.01)
(52) U.S. Cl. ........................ 348/665; 348/663
(58) Field of Classification Search .......... 348/663, 348/665
See application file for complete search history.

(56) References Cited

U.S. PATENT DOCUMENTS

| | | | | |
|---|---|---|---|---|
| 4,179,705 A | * | 12/1979 | Faroudja | 348/666 |
| 4,470,069 A | * | 9/1984 | Lewis et al. | 348/665 |
| 6,288,754 B1 | * | 9/2001 | Ito | 348/663 |
| 7,515,211 B2 | * | 4/2009 | Asamura et al. | 348/663 |
| 2002/0041338 A1 | * | 4/2002 | Shibutani et al. | 348/665 |
| 2003/0035070 A1 | * | 2/2003 | Fanous et al. | 348/707 |
| 2006/0007361 A1 | | 1/2006 | Satoh et al. | |

FOREIGN PATENT DOCUMENTS

| | | |
|---|---|---|
| JP | 2004-289575 | 10/2004 |
| JP | 2006-025089 | 1/2006 |

* cited by examiner

*Primary Examiner* — Jefferey Harold
*Assistant Examiner* — Michael Teitelbaum
(74) *Attorney, Agent, or Firm* — Blakely, Sokoloff, Taylor & Zafman LLP

(57) ABSTRACT

An embodiment has a C separating circuit which separates a carriage color signal and which outputs a reference, a lead, and a delayed composite video signals, a filter that extracts a high-frequency carriage color component with a significant variation in hue from the carriage color signal, a first calculation circuit which outputs a first luminance signal, a second calculation circuit which subtracts the carriage color signal from each of the reference, the preceding lead, and the delayed composite video signals and which derives a second luminance signal having an intermediate value, and a selection circuit which outputs the second luminance signal when the high-frequency carriage color component has a value larger than the reference value and which derives the first luminance signal when the high-frequency carriage color component has a value smaller than the reference value.

7 Claims, 6 Drawing Sheets

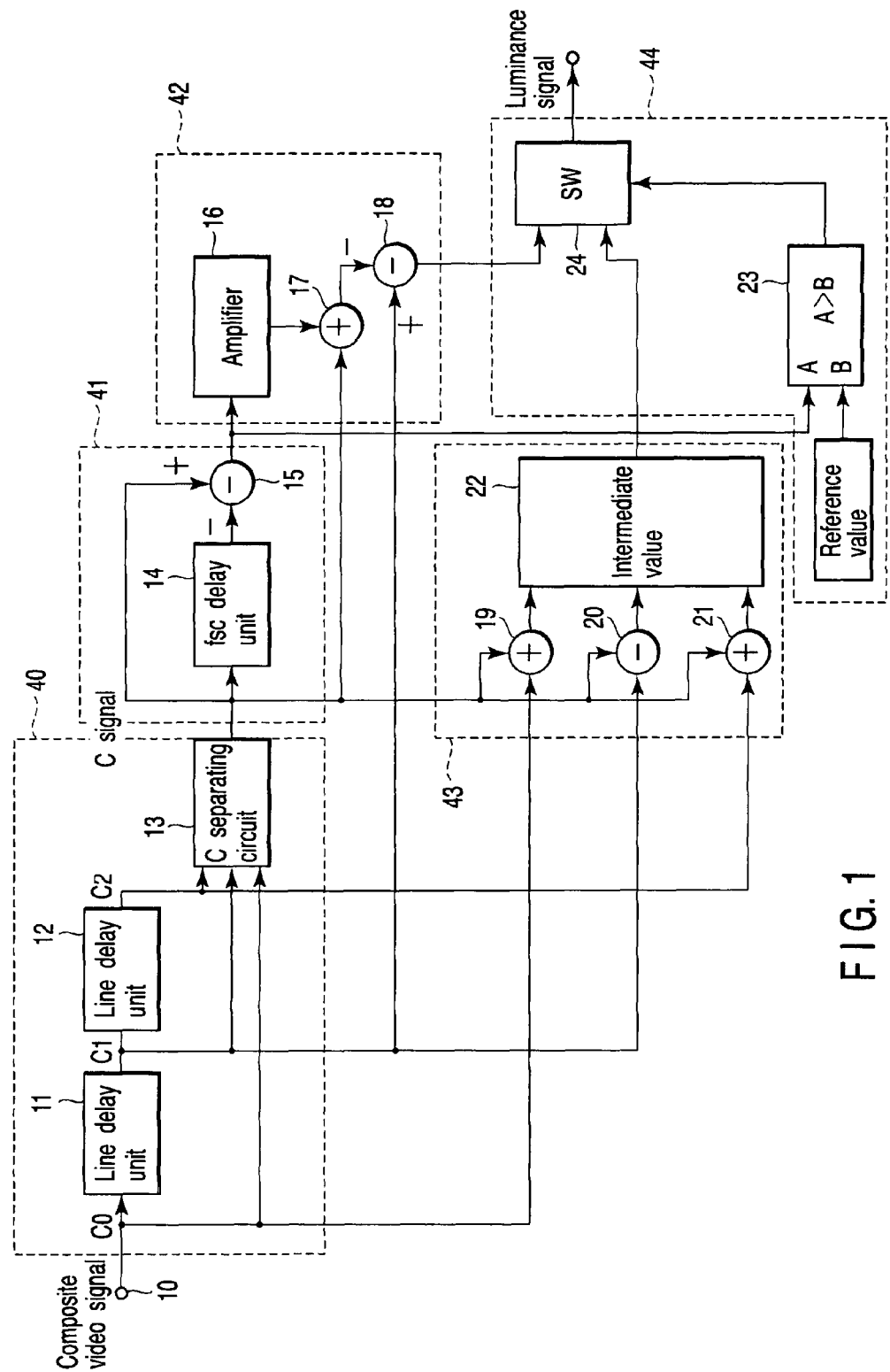
F I G. 1

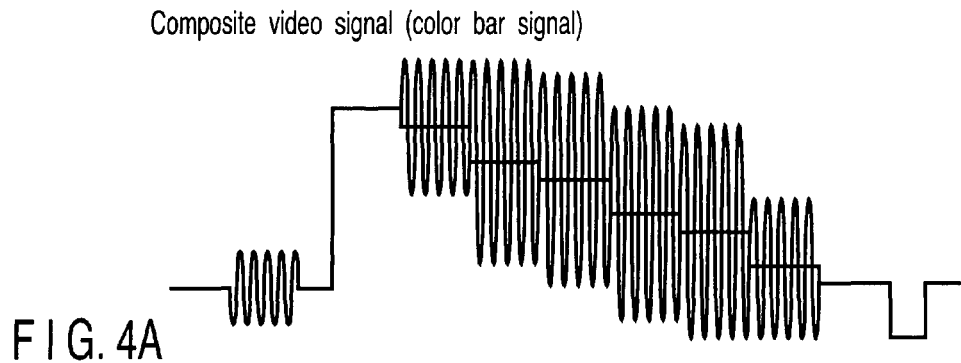
FIG. 4A  Composite video signal (color bar signal)
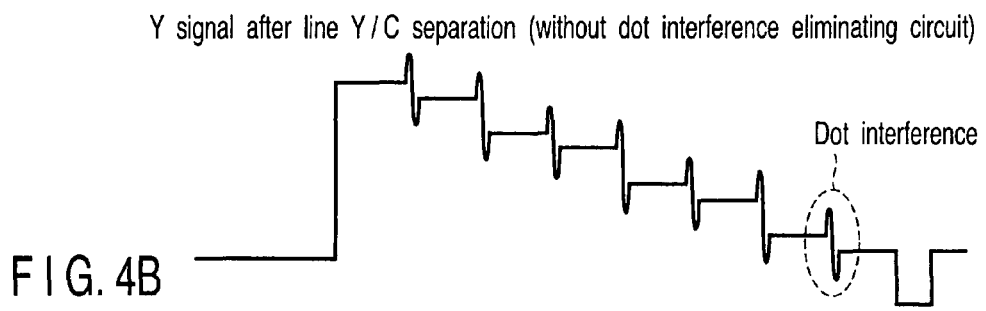
FIG. 4B  Y signal after line Y/C separation (without dot interference eliminating circuit)
Dot interference
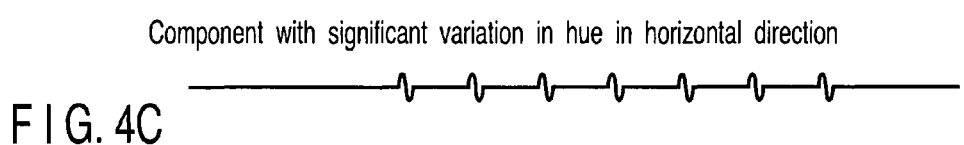
FIG. 4C  Component with significant variation in hue in horizontal direction
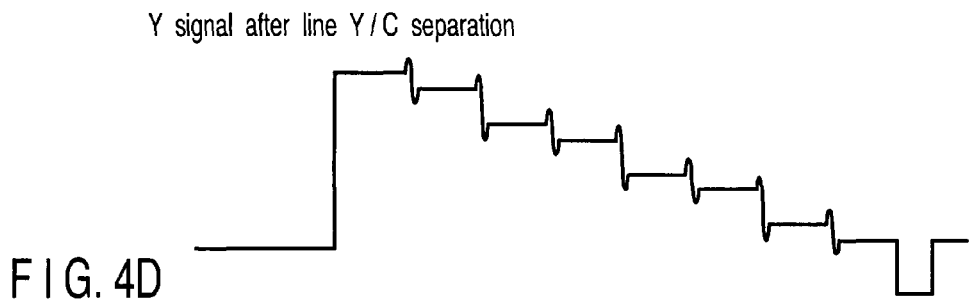
FIG. 4D  Y signal after line Y/C separation

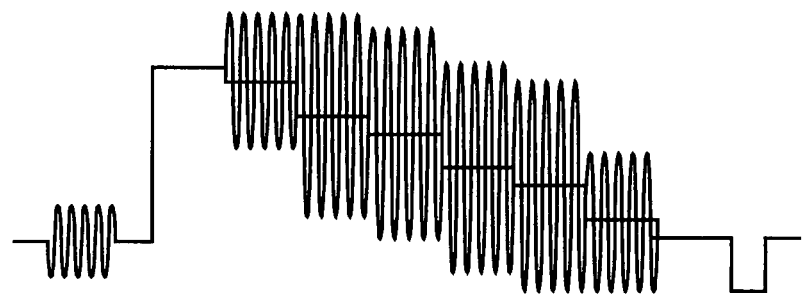
FIG. 5A — Composite video signal (color bar signal)
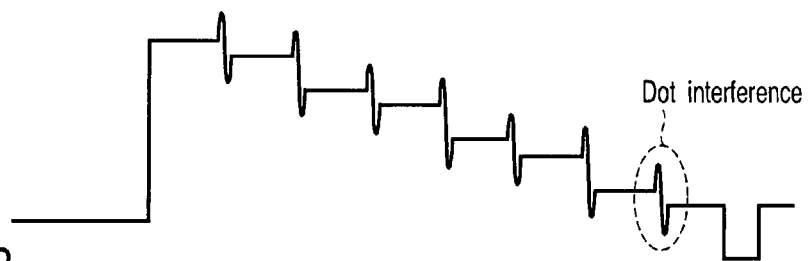
FIG. 5B — Y signal after line Y/C separation (without dot interference eliminating circuit), Dot interference
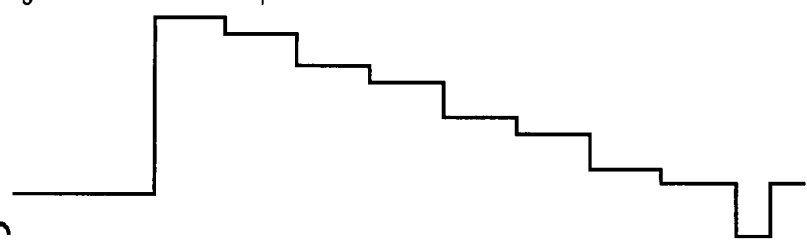
FIG. 5C — Y signal after line Y/C separation

LUMINANCE SIGNAL/CARRIAGE COLOR SIGNAL SEPARATING CIRCUIT AND METHOD

CROSS-REFERENCE TO RELATED APPLICATIONS

This application is based upon and claims the benefit of priority from Japanese Patent Application No. 2006-182052, filed Jun. 30, 2006, the entire contents of which are incorporated herein by reference.

BACKGROUND

1. Field

One embodiment of the invention relates to a luminance signal color carriage signal separating circuit (hereinafter simply referred to as a YC separating circuit) and method, the circuit being improved so as to have the enhanced ability to eliminate dot interference.

2. Description of the Related Art

Various YC separating circuits have been proposed (for example, Jpn. Pat. Appln. KOKAI Publication No. 2006-25098). The YC separating circuit separates a luminance signal (hereinafter referred to as a "Y signal") and a color carriage signal (hereinafter referred to as a "C signal") from a composite video signal (composite signal).

A YC separating method utilizes the inversion of the C signal at each horizontal period. This method determines the difference between horizontal lines to extract the C signal and then subtracts the extracted C signal from the composite signal to obtain the Y signal. Dot interference is likely to occur in this calculating process if the C signal is mixed into or remains in the Y signal. The dot interference is a phenomenon in which smaller dots appear in a part of the video corresponding to a part of the signal which contains discontinuous colors.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 1 is an exemplary block diagram showing the configuration of a luminance signal/carriage color signal separating circuit according to one embodiment of the present invention;

FIGS. 4A to 4D are signal waveform diagrams illustrating the operation of the circuit in FIG. 1;

FIGS. 5A to 5C are signal waveform diagrams illustrating the operation and effect of the circuit in FIG. 1.

DETAILED DESCRIPTION

Figure 2:
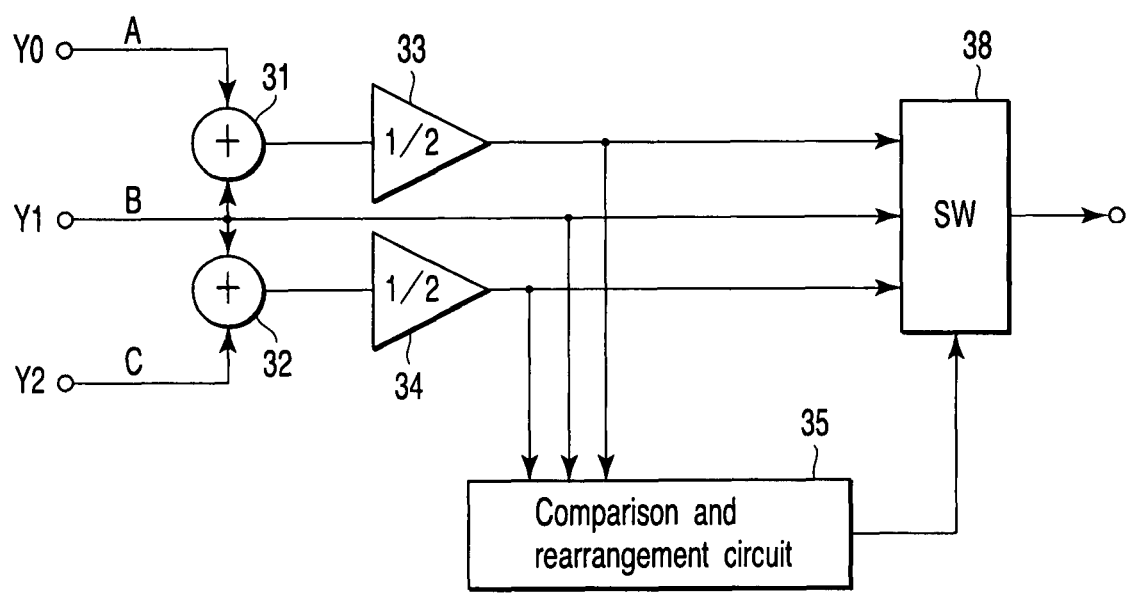
FIG. 2 is an exemplary diagram showing the specific configuration of an intermediate value circuit in FIG. 1.

Various embodiments according to the invention will be described hereinafter with reference to the accompanying drawings. FIG. 1 shows the configuration of a flat-panel video display apparatus to which the present invention is applied.

The YC separating circuit has a further problem. The inventor has focused on the fact that dot interference is particularly likely to occur in a part of a composite signal which involves a marked variation in hue.

One embodiment of the present invention provides a luminance signal/carriage color signal separating circuit that is able to appropriately eliminate dot interference to obtain a high-grade Y signal.

One embodiment of the present invention has a C separating circuit which uses a comb filter to separate a carriage color signal and which concurrently outputs a reference composite video signal serving as a reference, a lead composite video signal that is video scan one line ahead of the reference composite video signal, and a delayed composite video signal that is one video scan line behind the reference composite video signal, a high-frequency carriage color component extracting filter that extracts a high-frequency carriage color component with a significant variation in hue from the carriage color signal, a first calculation circuit which adds the high-frequency carriage color component to the carriage color component and which subtracts the sum from the reference composite video signal to output a first luminance signal, a second calculation circuit which subtracts the carriage color signal from each of the reference composite video signal, the preceding lead composite video signal, and the delayed composite video signal and which selectively derives a second luminance signal having an intermediate value, and a selection circuit which selectively outputs the second luminance signal when the high-frequency carriage color component has a value larger than the reference value and which selectively derives the first luminance signal when the high-frequency carriage color component has a value smaller than the reference value.

According to the above embodiment can reduce dot interference in a part of the signal which involves a significant variation in hue. This enables image quality to further be improved.

Embodiments will be described below with specific reference to the drawings. FIG. 1 shows one embodiment of the present invention. This luminance signal/carriage color signal separating circuit roughly has a C separating circuit 40, a high-frequency carriage color component extracting filter 41, a first calculation circuit 42, a second calculation circuit 43, and a selection circuit 44.

A basic configuration according to the present invention is implemented by the C separating circuit 40 and the second calculating circuit 43. However, FIG. 1 shows a combination of the high-frequency carriage color component extracting filter 41, the first calculation circuit 42, and the selection circuit 44. These components will be described later.

A composite video signal is input to the C separating circuit 40, which then uses a comb filter to separate a carriage color signal (C signal) from the composite video signal. The separating circuit 40 further concurrently outputs a reference composite video signal C1 serving as a reference, a preceding lead composite video signal C2 that is one video scan line ahead of the reference composite video signal, and a delayed composite video signal C0 that is one video scan line behind the reference composite video signal.

The high-frequency carriage color component extracting filter 41 extracts a high-frequency carriage color component with a significant variation in hue from the carriage color signal (C signal).

The first calculation circuit 42 adds the high-frequency carriage color component to the carriage color component (C signal) and which subtracts the sum from the reference composite video signal C1 to output a first luminance signal. The second calculation circuit 43 subtracts the carriage color signal (C signal) from each of the reference composite video signal C1, the preceding lead composite video signal C2, and the delayed composite video signal C0. The second calculation circuit 43 then selects a signal for an intermediate value among the results of the subtractions and outputs it as a second luminance signal. The second calculation circuit 43 generally functions as a high-frequency vertical filter.

When the high-frequency carriage color component has a value larger than the reference value, the selection circuit 44 selectively outputs the second luminance signal. When the high-frequency carriage color component has a value smaller than the reference value, the selection circuit 44 selectively derives a first luminance signal.

Now, each of the circuits will be specifically described. A composite video signal supplied to an input terminal 10 is input to line delay units 11 and 12 connected in series. A composite video signal on an input side of the line delay unit 11 is defined as C0. A composite video signal on an output side of the line delay unit 11 is defined as C1. A composite video signal on an output side of the line delay unit 12 is defined as C2. The composite video signal C1 is a reference composite video signal.

The video composite signal C0, the video composite signal C1, and the video composite signal C2 are concurrently input to a C separator 13. The C separator 13 derives a C signal by separating the average of a value obtained by dividing the difference between the composite video signals C1 and C0 by 2 and a value obtained by dividing the difference between the composite video signals C1 and C2 by 2.

The separated C signal is input to an fsc delay unit 14 and a subtractor 15. The fsc delay unit 14 is a circuit having a predetermined delay amount corresponding to, for example, 1 cycle (0.5 cycle or 2 cycles) of a color carriage wave. The subtractor 15 subtracts a delayed C signal from the C signal. As a result, the output is zero for parts of two signals input to the subtractor 15 which involve no deviation in hue. If there is any deviation in hue, the difference component is output. That is, a part of the composite video signal which involves a marked variation in hue is detected. In other words, a high-frequency component of the color carriage component (high-frequency color carriage component) is extracted.

The high-frequency color component has its gain adjusted by an amplifier 16 and is input to an adder 17, which then adds the component to the carriage color signal (C signal). That is, the high-frequency component of the signal is emphasized to obtain a high-frequency emphasized C signal. An output (high-frequency emphasized C signal) from the adder 17 is input to the subtractor 18, which then subtracts the output from the composite video signal C1. This allows the subtractor 18 to provide a high-grade luminance signal with dot interference suppressed; the dot interference is likely to occur in a part of the signal which involves a significant variation in hue. The luminance signal from the subtractor 18 is referred to as a first luminance signal. The first luminance signal is input to one end of a switch 24 of the selection circuit 44.

However, it is difficult for the subtractor 18 to suppress all of the dot interference. Particularly if the hue varies significantly and the hue level is high, it may be difficult for the subtractor 18 to remove the high-frequency carriage color component contained in the composite video signal C1. To remove a high-level high-frequency carriage color component, the gain of the amplifier 16 may be increased to improve the ability of the subtractor 18 to cancel the high-frequency carriage color component. However, an increase in the gain of the amplifier 16 disadvantageously makes the high-frequency emphasized C signal unstable (unbalance between the C signal and the high-frequency component). This degrades the ability of the subtractor 18 to remove the carriage color component contained in the composite video signal C1.

If the high-frequency carriage color component output by the subtractor 15 is at a higher level and cannot be suppressed by the subtractor 18, the measures described below can be used to suppress dot interference to provide a high-grade luminance signal.

Specifically, in the second calculator 43, the composite video signals C0, C1, and C2 are input to the adder 19, subtractor 20, and adder 21, respectively, at one of their input terminals. The C signal from the C separating circuit 40 is input to the other input terminal of each of the adder 19, subtractor 20, and adder 21. Thus, the adder 19, subtractor 20, and adder 21 output luminance signals Y0, Y1, and Y2 obtained by the subtraction of the carriage color signal. The adder 19, subtractor 20, and adder 21 are used because the carriage color signal has its phase inverted for each line.

The luminance signals Y0, Y1, and Y2 are input to an intermediate value circuit 22, which selectively derives a luminance signals for an intermediate value. This luminance signal is referred to as a second luminance signal. The second luminance signal is input to the other end of the switch 24 of the selection circuit 44.

The switch 24 selectively derives the second luminance signal under the following conditions. A comparator 23 compares a high-frequency carriage color component A obtained by the subtractor 15 with a reference value B. When A>B, the switch 24 is controlled so as to selectively derive the second luminance signal.

FIG. 2 shows a specific example of the intermediate value circuit 22. The luminance signals Y0 and Y1 are input to an adder 31 for addition. The luminance signals Y1 and Y2 are input to an adder 32 for addition. Outputs from the adders 31 and 32 are divided by (½) dividers 33 and 34, respectively, with the results input to a switch 38. The luminance signal Y1 is also input to the switch 38, which executes a comparison and rearrangement process described below to selectively output one of the three inputs which corresponds to the intermediate value.

The output luminance signal from the (½) divider 33, the luminance signal Y1, and the output luminance signal from the (½) divider 34 are input to a comparison and rearrangement circuit 35. The comparison and rearrangement circuit 35 compares the input signals with one another and rearranges them in order of increasing value to determine the intermediate value. The comparison and rearrangement circuit 35 then controls the switch 38 so that the switch 38 selects the luminance signal for the intermediate value.

Figure 3:
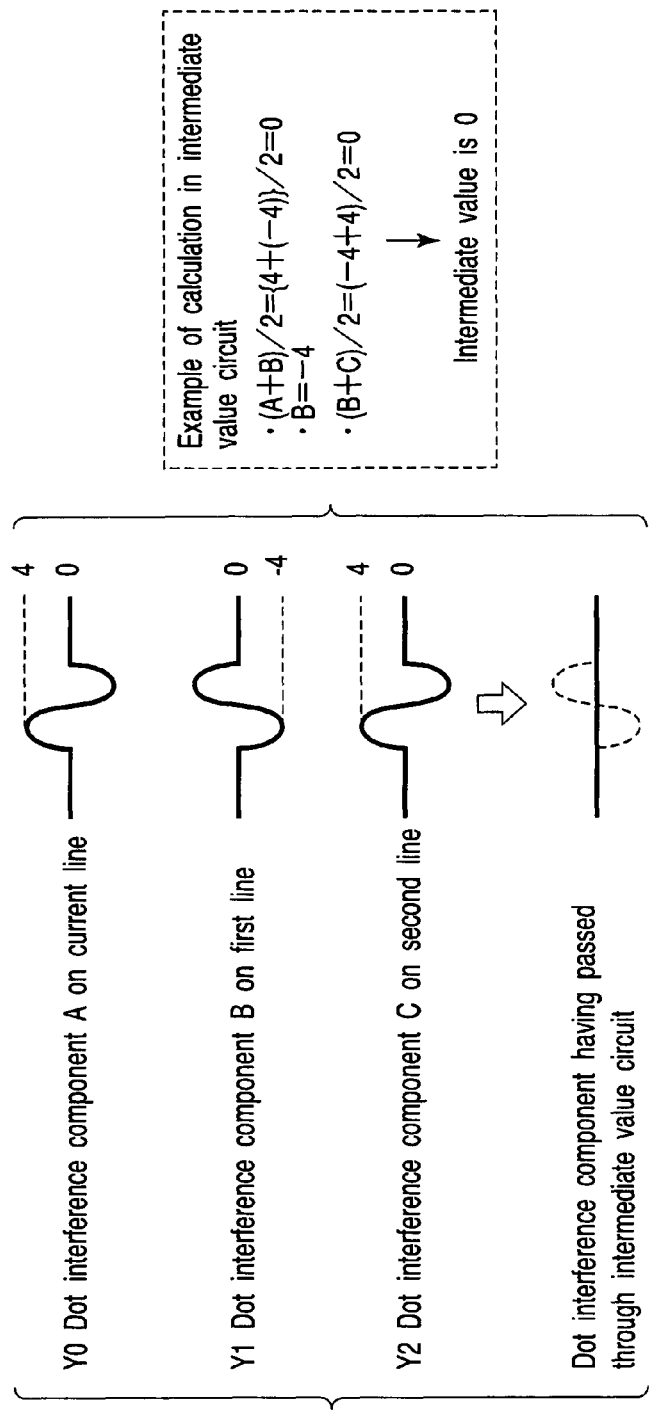
FIG. 3 is a diagram of dot interference components shown to describe the operation of the intermediate value circuit in FIG. 1.

The operation of the intermediate value circuit 22 will be described with reference to FIG. 3, on the assumption that dot interference is occurring in the luminance signal. In FIG. 3, dot interference components of the luminance signals Y0, Y1, and Y2 are defined as A, B, and C, respectively. When the dot interferences are assumed to have an amplitude of +4 or −4, the following equations are given.

$$[(A+B)/2]=[(4+(-4)/2]=0$$

$$B=-4$$

$$[(B+C)/2]=[(-4+4)/2]=0$$

These values are input to the comparison and rearrangement circuit 35 and switch 38. The values are rearranged in increasing order, that is, −4, 0, and 0. The intermediate value is 0. The comparison and rearrangement circuit 35 thus controls the switch 38 so that the switch 38 selects the output from the (½) divider 33 or 34. As described above, the output from the second calculation circuit 43 is a signal with dot interference suppressed.

FIGS. 4A to 4D show examples of signal waveforms resulting from the respective processes executed on a color bar signal input to the YC separating circuit and containing a carriage color signal with a significant variation in phase. FIG. 4A shows a color bar signal. FIG. 4B shows an example of a Y signal obtained by YC separation but shows a waveform with dot interference not eliminated. FIG. 4C shows a component with a marked variation in hue in a horizontal direction, that is, high-frequency carriage color component. This component is output by the subtractor 15 in FIG. 1. This component is amplified and the amplified component is subtracted from the Y signal in FIG. 4B. This suppresses dot interference as shown in FIG. 4D. This Y signal corresponds to the first luminance signal.

FIGS. 5A to 5C shows waveforms resulting from operations of the second calculation circuit 43 and selection circuit 44. FIG. 5A shows a color bar signal. FIG. 5B shows an example of a Y signal obtained by YC separation but shows a waveform with dot interference not eliminated. Operations of the second calculation circuit 43 and selection circuit 44 allows the second calculation circuit 43 to provide a Y signal with dot interference eliminated as shown in FIG. 5C. This Y signal corresponds to the second luminance signal.

If the carriage color component, which may cause dot interference, has a value larger than the threshold B, the selection circuit 44 selectively outputs the second luminance signal. In other words, the selection circuit 44 selects a luminance signal with the intermediate value from the luminance signals for the reference line and its preceding and succeeding lines. This function corresponds to a median filter that reduces noise in a vertical direction; the dot interference is suppressed by the processing in the vertical direction. The reference value is externally adjustable so as to set the optimum reference value B.

Figure 6:
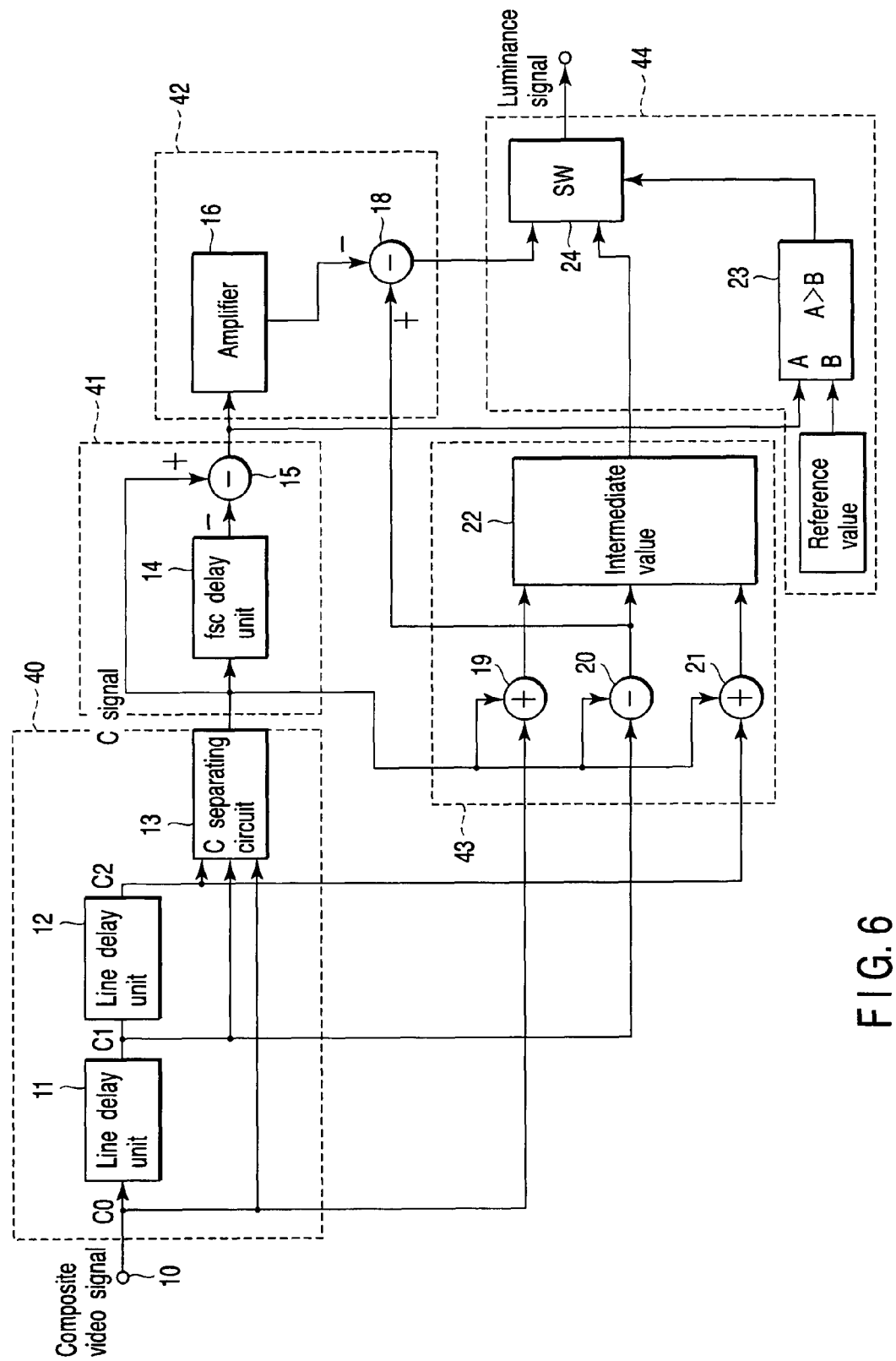
FIG. 6 is an exemplary block diagram of the configuration of a luminance signal/carriage color signal separating circuit according to another embodiment of the present invention.

FIG. 6 shows another embodiment of the present invention. Differences from the configuration in FIG. 1 will be described. The output Y signal from the subtractor 20 is input to the subtractor 18, which executes a subtraction process on the dot interference component remaining in the Y signal. The other parts of this embodiment are the same as the embodiment shown in FIG. 1 and will thus not described. FIG. 6 shows an intermediate value processing calculation circuit which subtracts the carriage color signal from each of the reference composite video signal, preceding lead composite video signal, and delayed composite video signal to generate a first, second, and third luminance signals and which selectively derives a fourth luminance signal that is an intermediate value among the first, second, and third luminance signals. A subtraction processing calculation circuit adds the high-frequency carriage color component and the carriage color component together and subtracts the sum from the first luminance signal to output a fifth luminance signal.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A separating circuit which separates a composite video signal containing combined luminance and chrominance signals, the separating circuit comprising:
   a comb filter to separate the chrominance signal and concurrently output a reference composite video signal serving as a reference, a lead composite video signal that is at least one video scan line ahead of the reference composite video signal, and a delayed composite video signal that is at least one video scan line behind the reference composite video signal;
   a filter to extract a high-frequency chrominance component from the chrominance signal;
   a first calculation circuit to add the high-frequency chrominance component to the chrominance signal to produce a sum result and to subtract the sum result from a reference composite video signal to output a first luminance signal;
   a second calculation circuit to subtract the chrominance signal from each of (i) the reference composite video signal, (ii) the lead composite video signal, and (iii) the delayed composite video signal to generate a plurality of concurrent luminance signals that undergo vertical filtering to generate a second luminance signal; and
   a selection circuit to selectively output either the second luminance signal when the high-frequency chrominance component has a value larger than a reference value or the first luminance signal when the high-frequency chrominance component has a value smaller than the reference value.

2. The separating circuit according to claim 1, wherein the filter includes a delay unit to delay the chrominance signal by a predetermined amount and a subtractor to subtract (i) an output from the delay unit from (ii) the chrominance signal.

3. The separating circuit according to claim 1, wherein the first calculation circuit comprises:
   an amplifier to amplify the high-frequency chrominance signal;
   an adder coupled to the amplifier, the adder to add an output from the amplifier to the chrominance signal; and
   a subtractor coupled to the adder, the subtractor to subtract an output from the adder from the reference composite video signal to obtain the first luminance signal.

4. The separating circuit according to claim 1, wherein the second calculation circuit comprises:
   a subtractor to subtract the chrominance signal from the reference composite video signal;
   a plurality of adders to subtract the chrominance signal from the lead composite video signal and the delayed composite video signal; and
   an intermediate value circuit coupled to the subtractor and the plurality of adders, the intermediate value circuit to extract, as the second luminance signal, a luminance signal corresponding to an intermediate value from the luminance signals obtained from the subtractor and the plurality of adders.

5. The separating circuit according to claim 1, wherein the selection circuit includes a comparison circuit and a switch to which the first luminance signal and the second luminance signals are input, the comparison circuit to compare the high-frequency chrominance signal with the reference value and controls the switch so that when the high-frequency chrominance signal is greater than the reference value, the second luminance signal is output.

6. The separating circuit according to claim 1, wherein the reference value is externally arbitrarily adjustable.

7. A separating circuit which separates a composite video signal containing combined luminance and chrominance signals, the separating circuit comprising:

a comb filter to separate a chrominance signal and concurrently output a reference composite video signal serving as a reference, a lead composite video signal that is at least one video scan line ahead of the reference composite video signal, and a delayed composite video signal that is at least one video scan line behind the reference composite video signal;

a filter to extracts a high-frequency chrominance component with a significant variation in hue from the chrominance signal;

an intermediate value processing calculation circuit to subtract the chrominance signal from each of (i) the reference composite video signal, (ii) the lead composite video signal, and (iii) the delayed composite video signal to generate a first, second, and third luminance signals, and to derive a fourth luminance signal that is an intermediate value among the first, second, and third luminance signals;

a subtraction processing calculation circuit to add the high-frequency chrominance component to the chrominance component to produce a sum result and subtract the sum result from the first luminance signal to output a fifth luminance signal; and a selection circuit to selectively output either the fourth luminance signal when the high-frequency chrominance component has a value larger than a reference value or the fifth luminance signal when the high-frequency chrominance component has a value less than the reference value.

* * * * *